(No Model.)

F. B. MUNROE.
HOSE SPANNER.

No. 342,923.  Patented June 1, 1886.

Witnesses.
S. N. Piper
R. B. Torrey

Inventor.
Frank B. Munroe.
by R. H. Eddy, atty.

UNITED STATES PATENT OFFICE.

FRANK B. MUNROE, OF LYNN, MASSACHUSETTS.

HOSE-SPANNER.

SPECIFICATION forming part of Letters Patent No. 342,923, dated June 1, 1886.

Application filed October 19, 1885. Serial No. 180,380. (No model.)

*To all whom it may concern:*

Figure 1:
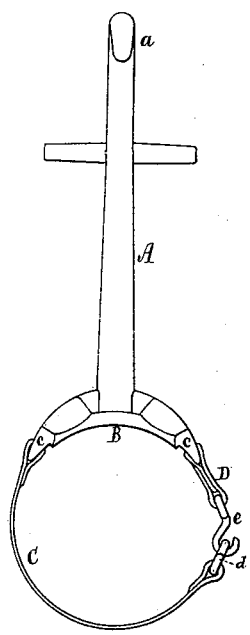
Figure 2:
Figure 3:
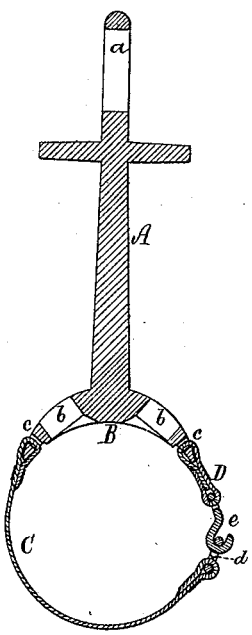
Figure 4:
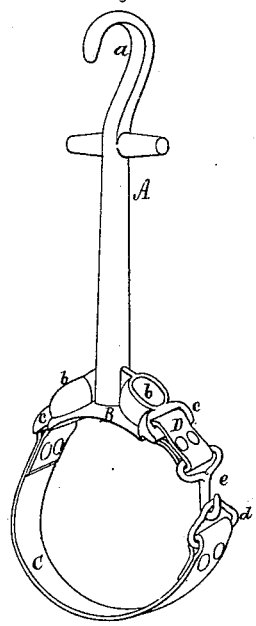

Be it known that I, FRANK B. MUNROE, of Lynn, in the county of Essex, of the Commonwealth of Massachusetts, have invented a new and useful Improvement in Hose-Spanners; and I do hereby declare the same to be described in the following specification, and represented in the accompanying drawings, of which—
Figure 1 is a side view, Fig. 2 an edge elevation, Fig. 3 a longitudinal section, and Fig. 4 a perspective view, of a spanner of my invention, the nature of which is defined in the claim hereinafter presented.
In such drawings the spanner is shown as having a cross-shaped handle, A, extending from the middle of an arched head, B, such handle having a hook, $a$, at its upper part. The arched head has two holes, $b$ $b$, made through it to receive the studs of a hose-coupling, and such head at its ends has eyes $c$ $c$, for connecting with it one strap, C, provided with a ring, $d$, and another or shorter strap, D, furnished with a hook, $e$, to engage with the ring. In the place of the hook and ring a buckle may be used suitably connected with the arched head at one end thereof, and to engage with a strap properly applied or fastened to the other end of such head.

The spanner thus made can be employed not only to aid in revolving the revoluble part of a hose-coupling, but for lifting and moving a hose, or for supporting it by hitching the hook on the round of a ladder. The straps, with their connecting devices, serve to aid securing the spanner to a hose or its coupling.

I claim—

The hose spanner, substantially as described, consisting of the hooked and cross-shaped handle, the curved head with its holes, the straps secured to such head, and the hook and ring applied to such straps, all being arranged essentially and for use as set forth.

FRANK B. MUNROE.

Witnesses:
R. H. EDDY,
ERNEST B. PRATT.